United States Patent
Nick et al.

(10) Patent No.: US 6,838,968 B2
(45) Date of Patent: Jan. 4, 2005

(54) TRANSFORMER WITH FORCED LIQUID COOLANT

(75) Inventors: Wolfgang Nick, Nünberg (DE); Reinhard Schlosser, Bernried (DE); Heinz Schmidt, Möhrendorf (DE); Peter van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/677,446

(22) Filed: Oct. 2, 2003

(65) Prior Publication Data

US 2004/0070475 A1 Apr. 15, 2004

Related U.S. Application Data

(63) Continuation of application No. PCT/DE02/00902, filed on Mar. 8, 2002.

(30) Foreign Application Priority Data

Apr. 4, 2001 (DE) .......................................... 101 17 847

(51) Int. Cl.[7] ............................................. H01F 27/10
(52) U.S. Cl. ............................. 336/57; 336/58; 336/60
(58) Field of Search ............................. 336/55, 57, 58, 336/60

(56) References Cited

U.S. PATENT DOCUMENTS

| | | | |
|---|---|---|---|
| 2,388,566 A | 11/1945 | Paluev | 175/361 |
| 2,904,760 A | 9/1959 | Johnston | 336/60 |
| 2,942,213 A | 6/1960 | Camilli et al. | 336/60 |
| 3,629,758 A | * 12/1971 | Pearce, Jr. | 336/57 |
| 4,145,679 A | * 3/1979 | Mitchell, Jr. | 336/57 |
| 4,245,206 A | * 1/1981 | Daikoku et al. | 336/60 |
| 4,424,502 A | 1/1984 | Kullinger et al. | 336/57 |
| 4,593,261 A | 6/1986 | Forster et al. | 335/300 |
| 5,107,240 A | * 4/1992 | Tashiro et al. | 336/60 |
| 5,508,672 A | 4/1996 | Sokai | 336/57 |
| 5,736,915 A | * 4/1998 | Goedde et al. | 336/55 |

FOREIGN PATENT DOCUMENTS

| | | | | |
|---|---|---|---|---|
| DE | 3404457 C2 | 1/1989 | ............ | H01F/7/20 |
| DE | 195 02 549 A1 | 8/1996 | ............ | H01F/6/04 |
| DE | 196 04 805 C2 | 3/2001 | ............ | H01F/6/06 |
| EP | 0 993 007 | 9/1999 | ............ | H01F/27/12 |

* cited by examiner

*Primary Examiner*—Anh Mai
(74) *Attorney, Agent, or Firm*—Baker Botts L.L.P.

(57) ABSTRACT

In order to cool the windings, core and optionally the wall of the element (1) receiving the windings (3,4) and the core (2) as effectively as possible, conducting surfaces (5, 6, 8,15) are disposed inside said element in such a way that the flow of coolant initially passes along the windings (3,4), followed by the limbs (21,22) of the core surrounded by the windings, and subsequently the other areas (23, 24, 1). Said arrangement of conducting surfaces is particularly suitable for use with transformers having superconductive windings made of HTSL conductor material.

16 Claims, 2 Drawing Sheets

US 6,838,968 B2

TRANSFORMER WITH FORCED LIQUID COOLANT

CROSS REFERENCE TO RELATED APPLICATION

This application is a continuation of copending International Application No. PCT/DE02/00902 filed Mar. 8, 2002 and claiming a priority date of Apr. 4, 2001, which designates the United States.

TECHNICAL FIELD OF THE INVENTION

The invention relates to the field of basic electrical components and is applicable to the design configuration of a transformer which is provided with guide surfaces for guiding the coolant for forced liquid cooling.

BACKGROUND OF THE INVENTION

Air, oil or—for transformers with superconducting windings composed of high-temperature superconductor material (HTSL)—liquefied gases are used for forced cooling of the windings and of the core, which carries the magnetic flux, in transformers. In order to design the cooling to be as effective as possible, a flow path is normally specified for the coolant within the scaled tank which holds the core and the upper and lower voltage windings which are in each case associated with one another concentrically. In a known transformer of this type, the upper and lower voltage windings which are in each case associated with one another concentrically are arranged in annular, pocket-like chambers, which are open at the top and thus towards the rest of the tank volume. A further chamber, which is annular but is designed to be flat, is arranged underneath these pocket-like chambers and is provided with through-openings to the pocket-like chambers. Fresh coolant flows via an inlet into the flat chamber, where it is distributed into the pocket-like chambers, rises in them, and then flows into the rest of the interior of the tank before leaving the tank via an outlet. In this way, the coolant absorbs heat first of all from the windings and then from the magnetic core and the wall of the tank, and finally from the current feeders and winding connections. The walls of the chambers and the surfaces of the core and of the tank in this case form guide surfaces for guiding the coolant (U.S. Pat No. 4,424,502 A1).

SUMMARY OF THE INVENTION

Against the background of the transformer, the invention is based on the object of influencing the flow of the liquid coolant in order to ensure that all the parts to be cooled are cooled as effectively as possible.

In order to achieve this object, the invention provides for the guide surfaces to be arranged such that the coolant flow has two or more flow areas which are arranged one behind the other in the flow direction, a first of which is associated with the windings, a second of which is associated with the limbs of the core which surround the windings.

A third flow area can be associated with the other upper parts of the core and of the wall of the housing. The staggered arrangement of two or more specific flow areas for the coolant makes optimum use of the coolant. This use is essentially ensured in one design refinement of the invention in that the core, which is approximated in steps to a circular cross section, is provided with a binding in the area of the windings, forming channels thus forming coolant channels between the limbs and the binding, which have an approximately triangular cross section. In order to allow the coolant to flow through these channels, two windings which are associated with one another concentrically are in each case arranged at a distance both from one another and from the core, with the inner of the two windings which are in each case associated with one another concentrically being arranged on the outside of a first mounting cylinder, and the outer winding being arranged on the inside of the second mounting cylinder; furthermore, an annular gap is formed between the first mounting cylinder and the binding, and a first annular chamber on one end face, and the second annular chamber on the other end face, are associated with the two windings. In this case, the first annular chamber is connected to the coolant inlet, the two annular chambers are provided with openings which lead into the intermediate space between the two windings, and the second chamber is adjacent to the core and is open towards the annular gap and towards the channels—if care is also taken in this ease to ensure that the coolant inlet and the coolant outlet—located opposite one another—are associated with the two end faces of the windings, and that the second annular chamber is associated with that end face of the windings which faces the coolant outlet, then this results in a coolant flow which covers the various areas of the transformer in an optimized sequence.

In order to ensure that cooling channels with an adequate cross section are formed between the magnetic core of the transformer and the binding that surrounds it even at locations in the core where there is a chord-like discrepancy, it may be expedient to arrange a rod-like spacer, which prevents flattening of the binding, at each of these locations in order to approximate the core cross section and the circumference of the binding to a circle.

BRIEF DESCRIPTION OF THE DRAWINGS

One exemplary embodiment of the new transformer is illustrated schematically in FIGS. 1 and 2.

DETAILED DESCRIPTION OF THE PREFERRED EMBODIMENTS

Figure 1:
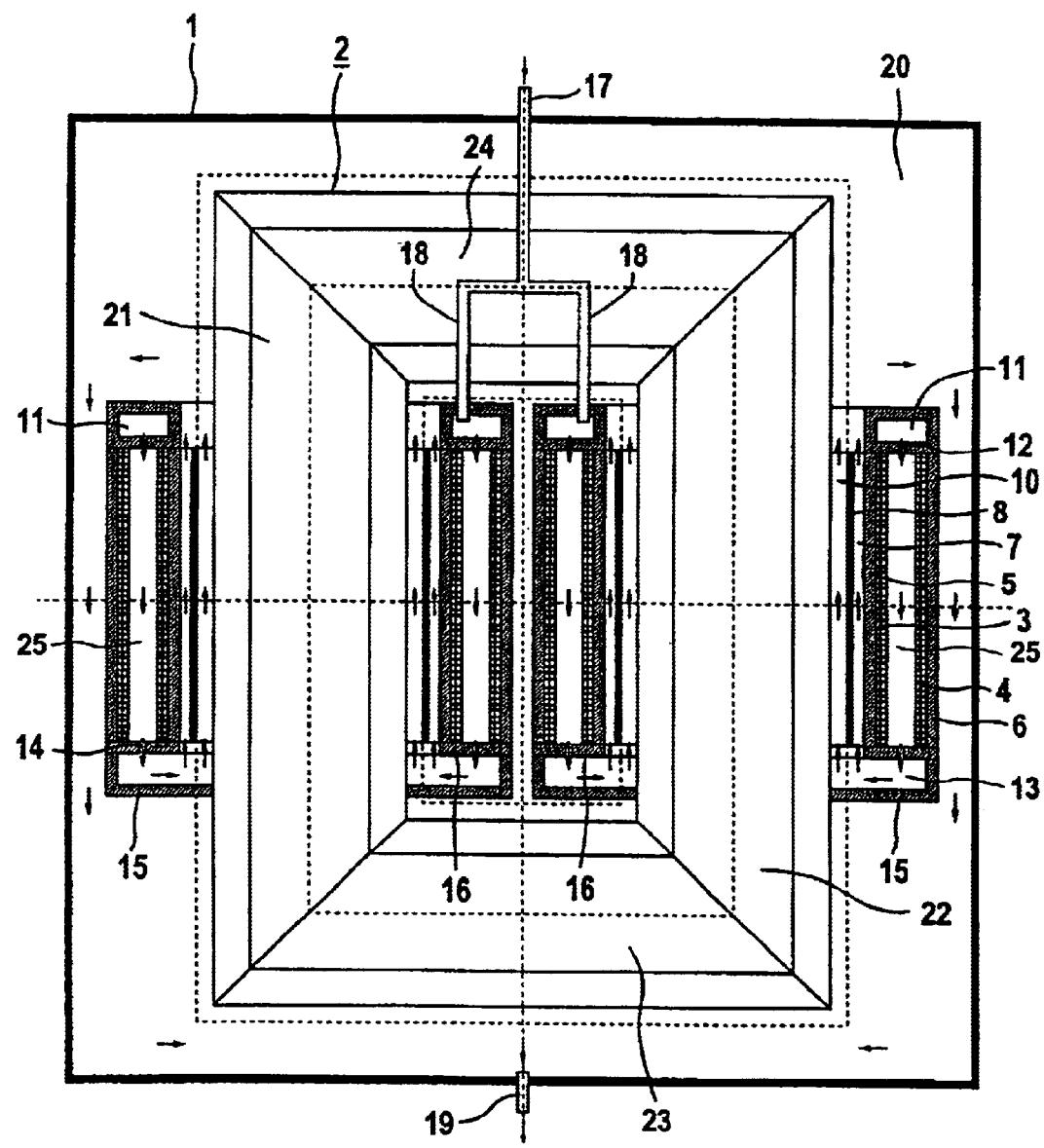
FIG. 1 shows a vertical section through a vertically arranged transformer.

FIG. 1 shows a transformer which has a tank 1 for holding the electrically effective components. In the case of an oil-insulated transformer, the tank 1 forms the outer housing. In the case of a transformer with superconducting windings, the tank forms the inner wall of the thermal insulation.

Figure 2:
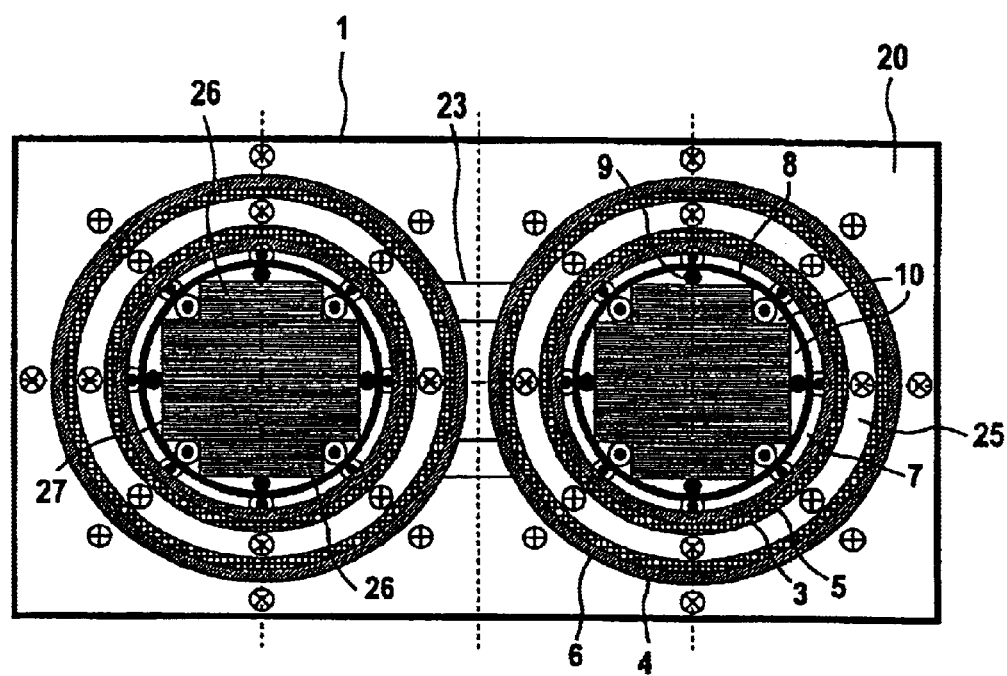
FIG. 2 shows a horizontal section through the arrangement shown in FIG. 1.

The tank contains, inter alia, the magnetic core 2, which has a lower yoke 23, a left-hand limb 21, a right-hand limb 22 and an upper yoke 24. As shown in the cross section illustrated in FIG. 2, the magnetic core 2 is designed such that it has an area 27 with a larger rectangular cross section, and two areas 26 with a smaller, flat rectangular cross section. This results in the core cross section being roughly approximated to a circular area, with chord-like discrepancies from the circular cross section. These discrepancies form flat or right-angled isosceles triangles.

The two limbs 21 and 22 of the magnetic core 2 each have two associated windings 3 and 4, which are arranged at a distance from one another concentrically. The inner winding 3 is in this case also arranged at a distance from the core 2. The winding 3 is located on the outside of a first mounting cylinder 5, while the winding 4 is arranged on the inside of a second mounting cylinder 6. The second mounting cylinder 6 may in this case be formed, for example, by a binding.

The windings 3 and 4 extend over a specific length of the two limbs 21 20 and 22. The limbs are each provided over approximately the same length with a binding 3 which forms a hollow cylinder that is open at the ends. The hollow-cylindrical shape is in this case created by rod-like spacers 9 which are arranged in those areas of the core 2 which differ in the form of chords from the circular cross section. The arrangement of the binding 8 forms channels 10 through which the coolant in the tank 1 can flow in the manner described further below.

At the ends, the two windings 3 and 4 have a first associated annular chamber 11, which is provided with openings 12 to an annular intermediate space 25 which is located between the windings. On the opposite end face, the two windings 3 and 4 have a second associated annular chamber 13, which is likewise provided with openings 14 to the intermediate space 25. The second annular chamber is in this case designed such that the wall 20 extends as far as the core 2, while the wall 16 extends only as far as the first winding 3. The second annular chamber is thus open towards the channels 10, and towards the annular gap 7 which runs between the binding 8 and the first mounting cylinder 5.

The tank 1 is provided with a coolant inlet 19, which is arranged at the end with respect to the upper yoke 24, and from which tubular guides 18 lead to the two annular chambers 11. The coolant outlet 19 is arranged underneath the lower yoke 23 in the tank wall.

The coolant 20 which is located within the tank is first of all supplied via the coolant inlet 17 and the tubular guides 18 to the two first annular chambers 11. From there, the coolant flows, corresponding to the arrows that are shown (in FIG. 2 a distinction is drawn between the arrow head—a circle with a dot—and the arrow end—a circle with a cross), via the openings 12 that are provided in the chambers 11 into the annular intermediate space 25 between the two windings 3 and 4. This intermediate space forms the first effective flow area for the coolant, and is bounded by guide surfaces. The coolant flows out of the intermediate space 25 via the openings 14 into the second annular chamber 13, from where it flows into the channels 10 and into the annular gap 7 between the binding 8 and the first mounting cylinder 5. The channels 8 and the annular gap 7 form the second effective flow area. On leaving the channels 10 and the annular gap 7, the coolant flows into the rest of the interior of the tank 1, with this internal area forming the third flow area. As it flows through this area, it cools in particular the yokes of the core and the tank wall. The coolant then flows to the coolant outlet 19.

What is claimed is:

1. A transformer with forced liquid cooling, comprising:
   a core and upper and lower voltage windings, which are each associated with one another concentrically, and arranged in a sealed tank which is provided with an inlet and an outlet for a liquid coolant which flows through the interior of the tank, and
   guide surfaces which are used to guide the coolant being arranged between the inlet and the outlet such that the coolant flow has two or more flow areas which are arranged one behind the other in the flow direction, a first of which is associated with the windings, a second of which is associated with limbs of the core which surround the windings, and a third of which is associated with the other upper parts of the core and of the wall of the housing.

2. The transformer as claimed in claim 1, wherein in order to form the guide surfaces,
   two windings which are associated with one another concentrically are each arranged at a distance both from one another and from the core,
   the core, which is approximated in steps to a circular cross section, is provided with a binding in the area of the windings, forming channels,
   the inner of the two windings which are each associated with one another concentrically is arranged on the outside of a first mounting cylinder and the outer winding is arranged on the inside of a second mounting cylinder, with an annular gap being formed between the first mounting cylinder and the binding,
   the two windings have a first associated annular chamber on one end face, and have a second associated annular chamber on the other end face, with
   the first annular chamber being connected to the coolant inlet,
   both annular chambers being provided with openings which lead into an intermediate space between the two windings,
   and the second chamber being adjacent to the core and being open towards the annular gap and towards the channels.

3. The transformer as claimed in claim 2, wherein rod-like spacers are arranged at locations where the core has chord-like discrepancies on a circular cross section in order to approximate the cross section of the core and the circumference of the binding.

4. The transformer as claimed in claim 2, wherein the second mounting cylinder is formed by a supporting binding.

5. A transformer with forced liquid cooling, comprising:
   a sealed coolant tank having an inlet and an outlet,
   a core, upper and lower voltage windings being associated with one another concentrically, and arranged in said sealed tank, and
   guide surfaces for guiding the coolant being arranged between the inlet and the outlet such that the coolant flow has at least two flow areas which are arranged one behind the other in the flow direction, a first of which is associated with the windings, a second of which is associated with limbs of the core which surround the windings.

6. The transformer as claimed in claim 5, wherein a third flow area is associated with the other upper parts of the core and of the wall of the housing.

7. The transformer as claimed in claim 5, wherein two windings which are associated with one another concentrically are each arranged at a distance both from one another and from the core.

8. The transformer as claimed in claim 7, wherein the first annular chamber is connected to the coolant inlet.

9. The transformer as claimed in claim 7, wherein both annular chambers are provided with openings which lead into an intermediate space between the two windings.

10. The transformer as claimed in claim 7, wherein the second chamber is adjacent to the core and open towards the annular gap and towards the channels.

11. The transformer as claimed in claim 5, wherein the core, which is approximated in steps to a circular cross section, is provided with a binding in the area of the windings, forming channels.

12. The transformer as claimed in claim 5, wherein the inner of the two windings which are each associated with one another concentrically is arranged on the outside of a first mounting cylinder and the outer winding is arranged on the inside of a second mounting cylinder, with an annular gap being formed between the first mounting cylinder and the binding.

13. The transformer as claimed in claim 5, wherein the two windings have a first associated annular chamber on one end face, and have a second associated annular chamber on the other end face.

14. The transformer as claimed in claim 5, wherein in order to form the guide surfaces, two windings which are associated with one another concentrically are each arranged at a distance both from one another and from the core, the core, which is approximated in steps to a circular cross section, is provided with a binding in the area of the windings, forming channels, the inner of the two windings which are each associated with one another concentrically is arranged on the outside of a first mounting cylinder and the outer winding is arranged on the inside of a second mounting cylinder, with an annular gap being formed between the first mounting cylinder and the binding, the two windings have a first associated annular chamber on one end face, and have a second associated annular chamber on the other end face, with the first annular chamber being connected to the coolant inlet, both annular chambers being provided with openings which lead into an intermediate space between the two windings, and the second chamber being adjacent to the core and being open towards the annular gap and towards the channels.

15. The transformer as claimed in claim 14, wherein rod-like spacers are arranged at locations where the core has chord-like discrepancies on a circular cross section in order to approximate the cross section of the core and the circumference of the binding.

16. The transformer as claimed in claim 14, wherein the second mounting cylinder is formed by a supporting binding.

\* \* \* \* \*